United States Patent [19]  [11]  4,349,638
Narayan  [45]  Sep. 14, 1982

[54] PROCESS FOR THE PREPARATION OF FOAMS CHARACTERIZED BY ISOCYANURATE, AND/OR URETHANE LINKAGES INVOLVING THE USE OF ALKALI METAL AMMONIUM CARBOXYLATE CATALYSTS

[75] Inventor: Thirumurti Narayan, Grosse Ile, Mich.

[73] Assignee: BASF Wyandotte Corporation, Wyandotte, Mich.

[21] Appl. No.: 317,148

[22] Filed: Nov. 2, 1981

[51] Int. Cl.³ .................. C08J 9/14; C08G 18/14; C08G 18/22
[52] U.S. Cl. .................. 521/125; 521/129; 521/902
[58] Field of Search .................. 521/125, 129, 902

[56] References Cited

U.S. PATENT DOCUMENTS

| | | | |
|---|---|---|---|
| 4,026,836 | 5/1977 | Zimmerman et al. | 521/125 |
| 4,136,240 | 1/1979 | Zimmerman et al. | 521/115 |
| 4,169,921 | 10/1979 | Moss et al. | 521/125 |
| 4,256,846 | 3/1981 | Ohashi et al. | 521/125 |

*Primary Examiner*—Morton Foelak
*Attorney, Agent, or Firm*—David L. Hedden; Joseph D. Michaels

[57] ABSTRACT

The subject invention relates to the use of alkali metal ammonium carboxylates as catalysts in the preparation of rigid and flexible foams characterized by isocyanurate and/or urethane linkages. Alkali metal ammonium carboxylates are the reaction products of a tertiary amine and an alkali metal acid salt of a polycarboxylic acid.

12 Claims, No Drawings

PROCESS FOR THE PREPARATION OF FOAMS CHARACTERIZED BY ISOCYANURATE, AND/OR URETHANE LINKAGES INVOLVING THE USE OF ALKALI METAL AMMONIUM CARBOXYLATE CATALYSTS

BACKGROUND OF THE INVENTION

1. Field of the Invention

The subject invention relates to the use of alkali metal ammonium carboxylates as catalysts in the preparation of rigid and flexible foams characterized by isocyanurate and/or urethane linkages. Alkali metal ammonium carboxylates are the reaction products of a tertiary amine and an alkali metal acid salt of a polycarboxylic acid.

2. Description of the Prior Art

Rigid and flexible foams characterized by isocyanurate and/or urethane linkages are known in the art. The prior art discloses methods for preparing foams by reacting an organic polyisocyanate with a polyol in the presence of a catalyst and a blowing agent.

U.S. Pat. No. 4,136,240 discloses metallic quaternary ammonium carboxylates, which are the reaction products of a tertiary amine, a monoalkali metal salt of a dicarboxylic acid, and an alkylene oxide. These products are used as catalysts in the preparation of rigid and flexible foams characterized by isocyanurate and/or urethane linkages. The patent, however, does not disclose any utility for alkali metal ammonium carboxylates which are intermediates in the preparation of the reaction products of this patent.

SUMMARY OF THE INVENTION

The invention relates to the use of alkali metal ammonium carboxylates as catalysts for the preparation of foams characterized by isocyanurate and/or urethane linkages. Alkali metal ammonium carboxylates are reaction products of a tertiary amine and an alkali metal acid salt of a polycarboxylic acid. When employed as catalysts in foam preparation, such compounds provide reaction times which make them particularly suitable for pour-in-place rigid foam preparation.

DESCRIPTION OF THE PREFERRED EMBODIMENTS

Alkali metal ammonium carboxylates are prepared by reacting a tertiary amine and an alkali metal acid salt of a polycarboxylic acid. This metal ammonium carboxylate forming reaction can be exemplified by the following illustration using succinic acid, potassium hydroxide and triethylamine as the reactants.

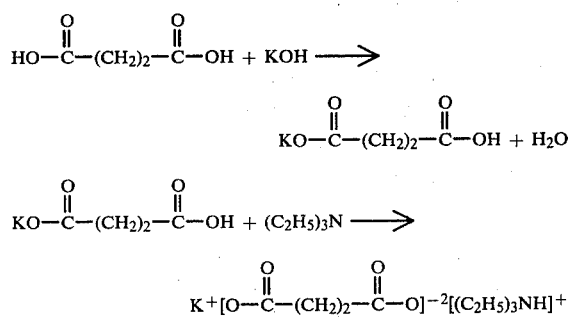

The tertiary amines which may be used to prepare the alkali metal ammonium carboxylates are amines which have three radicals bonded to the nitrogen atom with the proviso that the bond linking each of the radicals to the nitrogen atom is a carbon to nitrogen bond. The radicals bonded to the nitrogen atom may be the same or different. The tertiary amines may be aliphatic, alicyclic, aromatic, heterocyclic, or hybridized compounds. Specific examples of tertiary amines which may be used include trimethylamine, triethylamine, tripropylamine, triisopropylamine, butyldimethylamine, octyldimethylamine, dodecyldimethylamine, stearyldimethylamine, cetyldimethylamine, distearylmethylamine, dioctylethylamine, tri-t-butylamine, 1,3,5-tris(N,N-dimethylaminopropyl)-s-hexahydrotriazine, triethylamine, N,N-dimethylcyclohexylamine, 2,4,6-tris(dimethylaminomethyl)phenol, and triethylenediamine.

The alkali metal acid salt of a polycarboxylic acid, which is reacted with the tertiary amine, is prepared by reacting an alkali metal hydroxide, preferably sodium or potassium hydroxide with a polycarboxylic acid having from 2 to 20 carbon atoms, preferably succinic acid, maleic acid, fumaric acid, citric acid, aconitic acid, phthalic acid, isophthalic acid, terephthalic acid, trimellitic acid, trimesic acid, hemimellitic acid, oxalic acid, nitrilotriacetic acid, glutaric acid, adipic acid, and azelaic acid. For purposes of this invention, the term "polycarboxylic acid" is intended to include dicarboxylic acids.

The amount of alkali metal hydroxide to be reacted with the polycarboxylic acid may vary over wide ranges. However, it is preferred that at least one mole of alkali metal hydroxide is used per mole of polycarboxylic acid, with the proviso that no more than n−1 moles of alkali metal hydroxide are used per mole of polycarboxylic acid, where n represents the number of equivalents of carboxyl groups per mole of polycarboxylic acid. The amount of tertiary amine which is reacted with the alkali metal salt of the polycarboxylic acid may also vary over wide ranges, but it is preferable to use sufficient tertiary amine to react with substantially all of the carboxyl groups of the polycarboxylic acid which have not been converted to the alkali metal salt.

It should be noted that if the preferred reactant ratios are not utilized, products other than alkali metal ammonium carboxylates may be formed. Although it is preferred to maximize the yield of alkali metal ammonium carboxylate and eliminate the formation of other products and the presence of unreacted ingredients, minor amounts of other substances will not adversely affect the catalytic effect of the alkali metal ammonium carboxylates.

The alkali metal ammonium carboxylates are used as catalysts in the preparation of foams having isocyanurate and/or urethane linkages. The various ingredients used in the preparation of such foams will now be described. Thereafter, the specific processing conditions will be described.

Organic polyisocyanates which may be used in the preparation of foams are well known to those skilled in the art and may be represented by the following formula:

$$R''(NCO)_z$$

wherein $R''$ is a polyvalent organic radical which is either aliphatic, aralkyl, alkaryl, aromatic or mixtures thereof, and $z$ is an integer which corresponds to the valence of R'' and is at least two. Representative of the organic polyisocyanates contemplated herein includes, for example, aromatic diisocyanates such as 2,4-toluene diisocyanate, 2,6-toluene diisocyanate, mixtures of 2,4- and 2,6-toluene diisocyanate, crude toluene diisocyanate, diphenylmethane diisocyanate, crude diphenylmethane diisocyanate and the like; aromatic triisocyanates such as 4,4',4''-tri-phenylmethane triisocyanate, 2,4,6-toluene triisocyanates; aromatic tetraisocyanates such as 4,4'-dimethyldiphenylmethane-2,2',5,5'-tetraisocyanate, and the like; arylalkyl polyisocyanates such as xylene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the usable isocyanates are modifications of the above isocyanates which contain carbodiimide, allophanate, urea or isocyanurate structures. Prepolymers and quasi-prepolymers may also be employed as the organic polyisocyanate. The useful prepolymers are isocyanate-terminated reaction products of an organic polyisocyanate and an active hydrogen compound such as a polyol. The quasi-prepolymers are solutions of prepolymers in an excess of organic polyisocyanate and are prepared by reacting an excess of organic polyisocyanate or mixture thereof with a minor amount of an active hydrogen compound, preferably a polyol. Generally, the quasi-prepolymer will have a free isocyanate content of about 20 percent to 40 percent by weight. Active hydrogen compounds are those compounds which have in their structure reactive hydrogens as determined by the Zerewitinoff test, as described by Kohler in the *Journal of the American Chemical Society*, Vol. 49, page 3181 (1972). These compounds and their method of preparation are well known in the art.

Polyols which can be used to prepare the foams are well known to those skilled in the art. The polyols may have an equivalent weight of from 31 to 3000, and a functionality of from 2 to 8. Suitable polyols include: hydroxyl-terminated polyesters; polyoxyalkylenepolyether polyols; alkylene oxide adducts of organic compounds having at least 2 reactive hydrogen atoms such as amines, and thiols; and hydroxy-terminated acetals.

Any suitable hydroxy-terminated polyester may be used such as are obtained, for example, from the reaction of polycarboxylic acids of polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, propylene glycol, 1,4-butanediol, 1,3-butanediol, 1,2-butanediol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroquinone, and the alkylene oxide adducts of the above-named polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology*, Vol. 7, pp. 257–262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polyoxyalkylene polyether polyols may also be used as the reactive hydrogen-containing compound. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (Re 28,715), 3,304,273, 3,652,639, and 3,823,201 (Re 29,014), the disclosures of which are hereby incorporated by reference.

As was previously mentioned, other suitable polyols, which can be used in the reactive polyol composition of this invention, include the alkylene oxide adducts of organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two —SH groups such as 1,2-ethanedithiol, 1,2-propanedithiol, 1,3-propanedithiol, and 1,6-hexanedithiol; and alkene-thiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine such as crude methylene dianiline, diaminobenzenes, diaminonaphthalenes, 2,3-, 3,4-, 2,4-, 2,6-diaminotoluene and mixtures thereof; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

Blowing agents which are employed in the present invention are well known to those skilled in the art. Representative blowing agents include water, fluorocarbons such as trichloromonofluoromethane, 1,1,1-trichloro-2,2,2-trifluoroethane, tetrafluoromethane, bromotrifluoromethane, chlorotrifluoromethane, dibromodifluoromethane, trichlorethylene, chloroform, carbon tetrachloride and low boiling hydrocarbons such as butane, pentane and hexane. Included are the blowing agents disclosed in U.S. Pat. No. 3,922,238 which disclosure is herein incorporated by reference.

As an optional ingredient, chain extenders which have molecular weights of less than 400, preferably of 30 to 300, and preferably have 2 active hydrogen atoms, may also be used in the foam formulations. Examples of chain extenders include aliphatic and/or araliphatic diols having 2 to 14, preferably 2 to 6 carbon atoms such as ethylene glycol, 1,10-decanediol, diethylene glycol, dipropylene glycol and preferably 1,4-butanediol, 1,6-hexanediol and bis(2-hydroxyethyl)hydroquinone, triols such as glycerine and trimethylolpropane, and low molecular hydroxyl group-containing polyalkylene oxides based on ethylene oxide and/or propylene oxide and the above-referenced initiator molecules.

Secondary aromatic diamines can also be used as chain extenders. Examples include N,N'-dialkyl-substituted aromatic diamines which may be substituted by alkyl radicals at the aromatic nucleus having 1 to 20, preferably 1 to 4, carbon atoms in the N-alkyl radical such as N,N'-diethyl-, N,N'-di-secondary butyl-, N,N'-dicyclohexyl-4,4'-diaminodiphenylmethane and N,N'-di-secondary butylbenzidine. Other chain extenders include 3,3',5,5'-tetra-n-alkyl-substituted 4,4'-diaminodiphenylmethane such as 3,3',5,5'-tetramethyl-, -tetraethyl-, and -tetra-n-propyl-4,4'-diaminodiphenylmethane.

Other optional ingredients which may also be used in the foam formulations include surfactants such as the silicone surfactants, e.g., polyoxyalkylene-polyalkylsiloxane, and flame retardants such as tris(2-chloroethyl)phosphate.

Additional optional catalysts may also be employed. Included are organometallic catalysts such as dibutyltin dilaurate, dibutyltin diacetate, stannous octoate, lead octoate, and cobalt naphthenate; and tertiary amine catalysts such as, triethylenediamine, 1,3,5-tris(N,N-dimethylaminopropyl)-s-hexahydrotriazine.

In order to prepare isocyanurate foams, an organic polyisocyanate is mixed with the alkali metal ammonium carboxylate, a blowing agent, and other optional ingredients at initiating temperatures ranging from 0° C. to 150° C. Foams with urethane and/or isocyanurate linkages are prepared by reacting the organic polyisocyanate with a polyol and other optional ingredients in the presence of the alkali metal ammonium carboxylate and blowing agent such that the ratio of isocyanate groups of the organic polyisocyanate to active hydrogens of the polyol and other ingredients is from 10:1 to 1.2:1. In order to prepare foams with urethane linkages, the organic polyisocyanate is reacted with a polyol and other optional ingredients in the presence of the alkali metal ammonium carboxylate and blowing agent such that the ratio of isocyanate groups of the organic polyisocyanate to active hydrogens of the polyol and other ingredients is from 1.2:1 to 0.9:1. The amount of alkali metal ammonium carboxylate used to prepare the various foams may range from 0.1 weight percent to 10 weight percent based on the weight of the organic polyisocyanate.

Following are specific, non-limiting examples which are provided to illustrate the enumerated principles described herein. All parts are by weight unless otherwise specified.

The test method employed to determine the density of the foams was ASTM D-1622-23 (1970). The foams were analyzed by infra-red spectroscopy. The foams exhibited isocyanurate and/or urethane linkages.

In the tables below, the following abbreviations are employed:
AA—adipic acid
AZA—azelaic acid
DC-193—polyoxyethylene-polyalkylsiloxane copolymer surfactant
DMCHA—N,N-dimethylcyclohexylamine
DMP30—2,4,6-tris(dimethylaminomethyl)phenol
FREON 11B—monofluorotrichloromethane
L-5340—silicone surfactant
MA—maleic acid
CMDI—crude methylene diphenyl diisocyanate, a product which results from the phosgenation of an aniline-formaldehyde condensation product and which has an average functionality of from 2.2 to 3.
NTA—nitrilotriacetic acid
OA—oxalic acid
POLYOL A—polyoxypropylated pentaerythritol having an equivalent weight of about 100.
POLYOL B—polyoxyethylated trimethylolpropane having an equivalent weight of about 250.
POLYOL C—polyoxyethylated toluene diamine having an equivalent weight of about 127.

POLYOL D—polyoxyethylated diethylene glycol modified with tetrachlorophthalic anhydride, having an equivalent weight of about 280.
SA—succinic acid
EG—ethylene glycol
TDH—1,3,5-tris(N,N-dimethylaminopropyl)-s-hexahydrotriazine
TEA—triethylamine
TEDA—triethylenediamine

EXAMPLES 1–17

Examples 1–17 illustrate the preparation of the catalysts of this invention. The catalysts were prepared by adding a mixture of the solvent (EG) and the dicarboxylic acid to a reaction vessel equipped with a mechanical stirrer, thermometer, addition funnel, and a condenser, and heating to about 60° C. to dissolve the acid and obtain a clear solution. While maintaining the temperature between 60° C. to 65° C., a 50 percent aqueous solution of potassium hydroxide was added drop-wise over a period of about one hour. The contents were then heated to 100° C. and maintained thereat for about one-half hour, then cooled at 60° C. The water of neutralization was then stripped at a pot temperature of about 70° C. and a subatmospheric pressure of about 8 millimeters of mercury. After all the water was removed, the tertiary amine was added drop-wise over a period of about 30 minutes to one hour while maintaining the temperature at about 60° C. After the addition was completed, the temperature of the reaction was raised to 80° C. and maintained thereat for about one hour. Thereafter, the contents were cooled to about 60° C., and any residual volatiles present were stripped at a pressure of about 10 millimeters of mercury.

The specific ingredients used and the amounts are provided in Table I which follows.

TABLE I

Preparation of Catalysts

| Example | KOH, eq. | Acid, eq. | | Amine (mole) | | EG, g | % Active Ingredients | Product |
|---|---|---|---|---|---|---|---|---|
| 1 | 1 | SA | (2) | TDH | (0.5) | 500 | 40 | liquid |
| 2 | 0.5 | SA | (1) | TDA | (0.5) | 250 | 34 | liquid |
| 3 | 0.17 | SA | (0.5) | TEA | (0.33) | 191 | 34 | slurry |
| 4 | 0.5 | SA | (1) | DMCHA | (0.5) | 250 | 36 | liquid |
| 5 | 0.5 | SA | (1) | DMP30 | (0.5) | 251 | 46 | liquid |
| 6 | 0.5 | SA | (1) | TEDA | (0.5) | 250 | 50 | liquid |
| 7 | 0.5 | MA | (1) | TEA | (1.5) | 250 | 34 | liquid |
| 8 | 0.5 | OA | (1) | TEA | (0.5) | 350 | 25 | slurry |
| 9 | 0.25 | OA | (0.5) | TDH | (0.25) | 125 | 48.5 | slurry |
| 10 | 0.5 | NTA | (1) | TEA | (0.5) | 250 | 35 | slurry |
| 11 | 0.33 | NTA | (1) | TEA | (0.66) | 250 | 39 | slurry |
| 12 | 0.5 | NTA | (1) | TDH | (0.25) | 250 | 43 | slurry |
| 13 | 0.33 | NTA | (1) | TEA | (1.12) | 250 | 48 | slurry |
| 14 | 0.66 | NTA | (1) | TDH | (0.33) | 250 | 45 | slurry |
| 15 | 0.5 | AA | (1) | TEA | (0.5) | 300 | 36 | slurry |
| 16 | 0.5 | AZA | (1) | TEA | (0.5) | 250 | 40 | slurry |
| 17 | 0.5 | AZA | (1) | TDH | (0.5) | 250 | 53.2 | slurry |

EXAMPLES 18–24

In Examples 18–24, the reactivity of several of the catalysts was tested in the preparation of a polyisocyanurate foam. The formulation used was as follows:
CMDI—100 parts
FREON 11B—20 parts
Catalyst—5 parts
DC193 Surfactant—2 parts
The reactivity data for the catalysts are provided in Table II which follows:

TABLE II

Alkali Metal-Ammonium Carboxylates as Polyisocyanurate Foaming Catalysts

| Example | Catalyst | Foaming Reactivity, seconds | | | Tack Free |
|---|---|---|---|---|---|
| | | Cream Time | Gel Time | Rise Time | |
| 18 | 1 | 8 | 26 | 51 | 35 |
| 19 | 2 | 12 | 80 | 178 | 160 |
| 20 | 4 | 11 | 75 | 135 | 150 |
| 21 | 5 | 11 | 78 | 175 | 170 |
| 22 | 12 | 8 | 12 | 32 | 16 |
| 23 | 14 | 9 | 27 | 80 | 90 |
| 24 | 17 | 28 | 33 | 65 | 135 |

EXAMPLES 25–29

In Examples 25–29, the reactivity of several of the catalysts were tested in the preparation of a polyurethane foam. The formulation used was as follows:
CMDI—75 parts
FREON 11B—20 parts
L 5340—1 part
Polyol A—48 parts
Catalyst—3 parts
The reactivity data for the catalysts are provided in Table III which follows:

TABLE III

Alkali Metal-Ammonium Carboxylates as Polyurethane Catalysts

| Example | Catalyst | Foaming Reactivity, seconds | | | Tack Free |
|---|---|---|---|---|---|
| | | Cream Time | Gel Time | Rise Time | |
| 25 | 2 | 37 | 67 | 106 | 82 |
| 26 | 4 | 36 | 64 | 101 | 80 |
| 27 | 6 | 27 | 45 | 74 | 50 |
| 28 | 7 | 70 | 130 | 200 | 170 |
| 29 | 14 | 155 | 245 | 355 | 340 |

EXAMPLES 30–46

In Examples 30–46, the reactivity of several catalysts were tested in the preparation of a poly(urethaneisocyanurate) foam. The formulation used was as follows:
CMDI—100 parts
FREON—20 parts
Polyol B—20 parts
DC193—2 parts
Catalyst—5 parts The reactivity data for the catalysts are given in Table IV which follows:

TABLE IV

Alkali Metal-Ammonium Carboxylates As Poly(Urethane-Isocyanurate) Foaming Catalysts

| Example | Catalyst | Cream Time | Gel Time | Rise Time | Tack Free |
|---|---|---|---|---|---|
| 30 | 1 | 2 | 3 | ~4 | ~4 |
| 31 | 2 | 3 | 9 | 23 | 12 |
| 32 | 3 | 10 | 65 | 95 | 400 |
| 33 | 4 | 3 | 8 | 23 | 10 |
| 34 | 5 | 5 | 9 | 31 | 11 |
| 35 | 6 | 3 | 6 | 21 | 15 |
| 36 | 7 | 10 | 20 | 58 | 40 |
| 37 | 8 | 8 | 16 | 40 | 70 |
| 38 | 9 | 8 | 16 | 40 | 70 |
| 39 | 10 | 14 | 40 | 100 | 185 |
| 40 | 11 | 33 | 97 | 170 | 335 |
| 41 | 12 | 8 | 12 | 32 | 16 |
| 42 | 13 | 34 | 105 | 150 | 360 |
| 43 | 14 | 4 | 8 | 28 | 14 |
| 44 | 15 | 27 | 33 | 48 | 37 |
| 45 | 16 | 27 | 30 | 53 | 35 |
| 46 | 17 | 7 | 10 | 30 | 16 |

EXAMPLE 47

Example 47 illustrates the preparation of a foam using an alkali metal ammonium carboxylate catalyst. The formulation, catalyst reactivity, and the foam properties are given in Table V which follows.

TABLE V

Properties of a Foam Prepared by Using Alkali Metal-Ammonium Carboxylate Catalyst

| Formulation | |
|---|---|
| CMDI | 200 |
| F11A | 50 |
| Polyol C | 20 |
| Polyol D | 20 |
| Catalyst | 2 |
| DC193 | 4 |
| Reactivity, seconds | |
| Cream Time | 22 |
| Gel Time | 70 |
| Rise Time | 95 |
| Tack Free | 190 |
| Properties | |
| Density | 1.7 pcf |
| Compr. Str., 10% defl. | 25.6 psi |
| Friability, wt. loss | 30 % |
| K Factor, initial | 0.133 |
| Aged, 10 days 140° F. | 0.164 |
| Closed Cells, uncorr. | 83.2 % |
| Closed Cells, corr. | 97.9 % |
| Butler Wt. Retention | |
| Wt. retained | 75 % |
| Time to self extinguish | 13 seconds |
| Flame ht. | 9.3 inches |

COMPARISON EXAMPLES A AND B

The reactivity of the metallic quaternary ammonium carboxylates described in U.S. Pat. No. 4,136,240 and the corresponding alkali metal ammonium carboxylates of the subject invention were compared. Examples 1 and 2 of U.S. Pat. No. 4,136,240 were duplicated except the alkoxylation step used in preparing the catalyst was eliminated. The reactivities of the alkali metal ammonium carboxylate thus prepared were tested by preparing foams in accordance with the formulations set forth in Table I of U.S. Pat. No. 4,136,240. The reactivity data of the catalysts are provided in Table VI which follows. A comparison of the data in Table VI with the data in Table I of U.S. Pat. No. 4,136,240 shows that the alkali metal ammonium carboxylate has slower reactivity than the metallic quaternary ammonium carboxylate. This slower reactivity makes them more suitable for pour-in-place foaming applications.

TABLE VI

Repeat of Examples 1 and 2 According to U.S. Pat. No. 4,136,240 but Using Alkali-Metal Ammonium Carboxylate Catalyst

| Reactivity, seconds | A | B |
|---|---|---|
| Cream Time | 29 | 50 |
| Rise Time | 140 | 175 |
| Tack Free | 300 | ~600 |

The embodiments of the invention in which an exclusive priviledge or property is claimed are defined as follows:

1. A process for the preparation of a cellular foam characterized by isocyanurate linkages which comprises reacting an organic polyisocyanate in the presence of a blowing agent and a catalytically sufficient amount of an alkali metal ammonium carboxylate consisting of the reaction product of a tertiary amine with an alkali metal acid salt of a polycarboxylic acid.

2. The process of claim 1 wherein the alkali metal ammonium carboxylate is prepared by reacting a tertiary amine selected from the group consisting of 1,3,5-tris(N,N-dimethylaminopropyl)-s-hexahydrotriazine; triethylamine, N,N-dimethylcyclohexylamine, 2,4,6-tris(dimethylaminomethyl)phenol, and triethylenediamine with an alkali metal acid salt of a polycarboxylic acid.

3. The process of claim 2 wherein the acid used to prepare the alkali metal acid salt of a polycarboxylic acid is an acid selected from the group consisting of succinic acid, maleic acid, oxalic acid, nitrilotriacetic acid, adipic acid, and azelaic acid.

4. The process of claim 3 wherein the organic polyisocyanate is crude methylene diphenyl diisocyanate.

5. A process for the preparation of a cellular foam characterized by urethane and/or isocyanurate linkages which comprises reacting one equivalent of an organic polyisocyanate and from 0.01 to 0.5 equivalent of a polyol in the presence of a blowing agent and a catalytically sufficient amount of an alkali metal ammonium carboxylate consisting of the reaction product of a tertiary amine with an alkali metal acid salt of a polycarboxylic acid.

6. The process of claim 5 wherein the alkali metal ammonium carboxylate is prepared by reacting a tertiary amine selected from the group consisting of 1,3,5-tris(N,N-dimethylaminopropyl)-s-hexahydrotriazine; triethylamine, N,N-dimethylcyclohexylamine, 2,4,6-tris(dimethylaminomethyl)phenol, and triethylenediamine with an alkali metal acid salt of a polycarboxylic acid.

7. The process of claim 6 wherein the alkali metal acid salt of a polycarboxylic acid is an acid selected from the group consisting of succinic acid, maleic acid, oxalic acid, nitrilotriacetic acid, adipic acid, and azelaic acid.

8. The process of claim 7 wherein the organic polyisocyanate is crude methylene diphenyl diisocyanate and the polyol is a polyether polyol having an average functionality of 2 to 8 and an average hydroxyl equivalent weight of 31 to 3000.

9. A process for the preparation of a cellular foam characterized by urethane linkages which comprises reacting an organic polyisocyanate with a polyisocyanate with polyol and other optional active hydrogen-containing compounds in the presence of a blowing agent and a catalytically sufficient amount of an alkali metal ammonium carboxylate consisting of the reaction product of a tertiary amine with an alkali metal acid salt of a polycarboxylic acid such that the ratio of isocyanate groups of the organic polyisocyanate to active hydrogens is from 0.9:1 to 1.2:1.

10. The process of claim 7 wherein the monoalkali metal ammonium carboxylate is prepared by reacting a tertiary amine selected from the group consisting of 1,3,5-tris(N,N-dimethylaminopropyl)-s-hexahydrotriazine; triethylamine, N,N-dimethylcyclohexylamine, 2,4,6-tris(dimethylaminomethyl)phenol, and triethylenediamine with an alkali metal salt of a polycarboxylic acid.

11. The process of claim 10 wherein the acid used to prepare the alkali metal acid salt of a polycarboxylic acid is an acid selected from the group consisting of succinic acid, maleic acid, oxalic acid, nitrilotriacetic acid, adipic acid, and azelaic acid.

12. The process of claim 11 wherein the organic polyisocyanate is crude methylene diphenyl diisocyanate and the polyol is a polyether polyol having an average functionality of 2 to 8 and an average hydroxyl equivalent weight of 31 to 3000.

* * * * *